Jan. 23, 1923.
H. KLUG.
FILTER FOR AIR AND GASES.
FILED FEB. 15, 1922.
1,443,134.
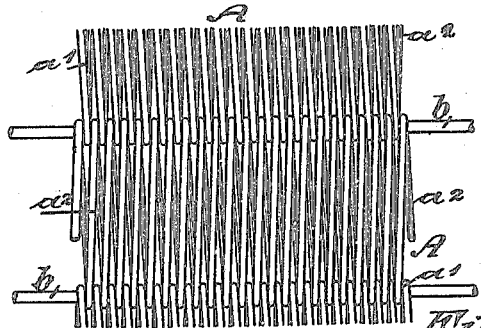
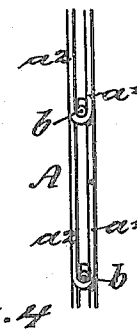
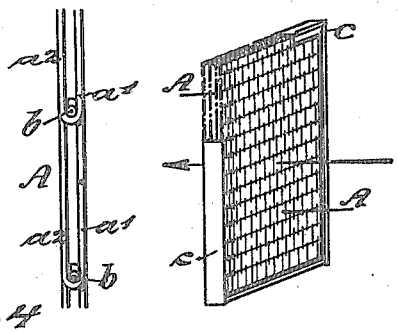
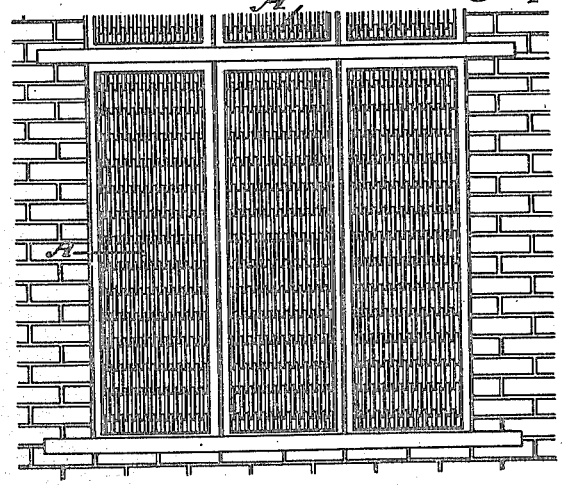
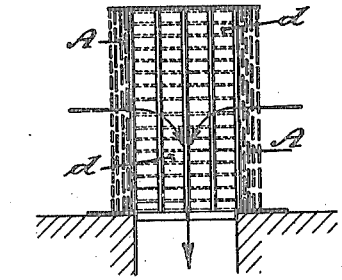
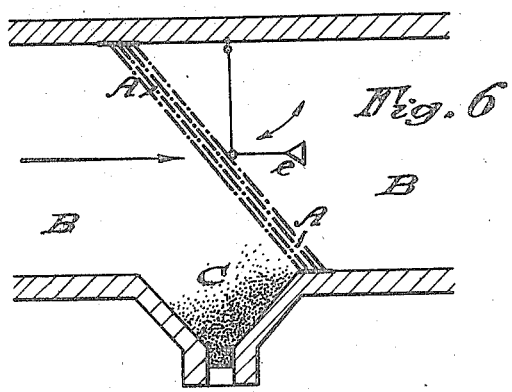
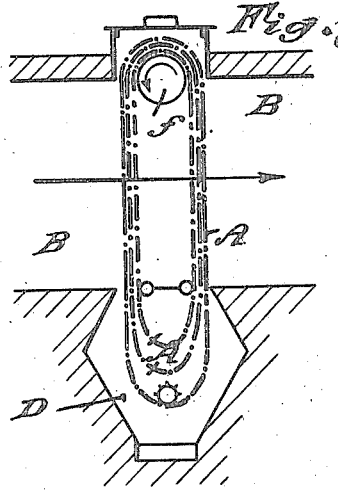
Inventor
Hermann Klug
by
Attorney.

Patented Jan. 23, 1923.

1,443,134

UNITED STATES PATENT OFFICE.

HERMANN KLUG, OF FROHNAU, NEAR BERLIN, GERMANY, ASSIGNOR TO THE FIRM: DEUTSCHE LUFTFILTER-BAUGESELLSCHAFT, OF BERLIN, GERMANY.

FILTER FOR AIR AND GASES.

Application filed February 15, 1922. Serial No. 536,813.

*To all whom it may concern:*

Be it known that I, HERMANN KLUG, a citizen of Germany, residing at Frohnau, near Berlin, Germany, have invented certain new and useful Improvements in Filters for Air and Gases, of which the following is a specification.

My invention refers to filters for air and gases and its particular object is to provide a filter of this kind which is more effective than those hitherto used.

In a large number of industries, using air or gas which must first be purified by elimination of impurities, including dust, soot and other foreign matter, the purification is as a rule effected either by filtering through textile fabric, or by means of filters consisting of shallow containers having front and rear covers of gauze or the like, with a filtering mass in the said containers consisting of numerous small bodies, such as small stones, rings, balls or the like, which were used in a dry state, or were moistened with water or other liquid, in some cases viscous, for the purpose of increasing the adhesion and retention of the dust particles. Filters of this kind can be cleansed by removing the acquired coating of dirt with a dry brush, or by washing the filter mass. This last mentioned type of filter has several advantages over cloth filters, but new demands have arisen in regard to efficiency, facility of manufacture, and also in regard to the possibility of cleaning the filters with ease but at the same time thoroughly.

The present invention provides a filter which has several very material and important advantages over these last mentioned filters, as will be made apparent in the course of the following description.

In the drawings affixed to this specification and forming part thereof several filters embodying my invention are illustrated diagrammatically by way of example. In the drawings Figs. 1 to 4 illustrate the construction and arrangement in general, and Figs. 5 to 7 show specific examples of design and arrangement.

Fig. 1 being a front elevation,

Fig. 2 a side elevation of part of a filter embodying my invention, while

Fig. 3 is a perspective view, with part of the frame broken away, of the filter as a whole.

Fig. 4 discloses an opening closed by a number of filters such as shown in Fig. 3.

Fig. 5 is a vertical section of a modification in which the filter bands are wound around a hollow reel or drum.

Fig. 6 is a similar view of another modification comprising tappers which serve for automatically cleaning the filter, and Fig. 7 is a vertical section of a filter composed of a plurality of endless bands suspended from a rotary spindle.

Referring to Figs. 1 and 2 of the drawings the filter is composed of a plurality of jointed bands, each made up of elements A linked with each other. The individual elements A, which shall be designated as links, can be constructed in any desired manner, for example of pieces of wire or strips of metal $a^1$, $a^2$, bent round transverse rods $b$, each rod $b$ forming a pivot for two links A, whose limbs mesh with each other where they embrace the rod. Preferably the wires are so coiled that the front limbs are inclined in relation to the rear limbs, that is to say the wires do not extend in straight lines.

The framing for the filter is preferably composed of a plurality of box-like cells $c$, as shown in Figs. 3 and 4, each cell forming an element of the filter, which can easily be taken out for renewal as required, but a single frame may be used, specially if the filter is of small or moderate size.

As shown in Figs. 3 and 4 the jointed bands are set closely together in the framing, superimposed so that the front surfaces of the links collectively constitute an unbroken wall, which is nevertheless pervious to streams of air or gas travelling for example as indicated by arrows in the drawing. The jointed bands can easily be adapted to the size of the filter or of its several elements, by lengthening or shortening them as required.

All the dust carried by the streams of air or gas is retained by the filter surfaces, and no dirt or foreign matter can pass through. Owing to the fact that the front and rear limbs of each link are out of line with each other, or staggered, each band opposes two obstructions to the stream of air or gas, first the front surfaces of the wires $a^1$ (the front half of each link) and then the front inner surface of the rear wires (the rear half of each link). By reason of the building up of the filter of a plurality of bands the air passing through the filter is split up into numerous narrow streams, and each of these streams is subjected in the filter to repeated sharp deflection, so that any particles of dust which penetrate into the filter encounter further obstructive surfaces, by which they are retained.

The cleansing effect can be increased by using a denser filter, in which the surfaces opposed to the air are multiplied and placed more closely together. This is facilitated by the fact that the baffle surfaces $a^1$ $a^2$ of each single band can be placed very closely together, one behind the other, and increased thickness can be obtained by placing a plurality of bands in series. With four bands thus placed the filter is already too dense to see through, but even with eight layers of wire the thickness is not excessive, and air can still pass through freely. In spite of the relatively small thickness of the layers of even a thick filter, the cavities within the bands, for the deposit of dust and for the reception of such liquid as may be used to assist the retention of dust, are comparatively large, and it is found that, say, a third of the space between the wires $a^1$ and $a^2$ (Fig. 2) may be filled up with deposit, both in height and width, before the obstruction gradually attains a degree at which it is too great for satisfactory function of the filter.

This fact enables increased density and increased efficiency to be obtained, without increase of thickness, by arranging that the joints of each band lie midway between the joints of the band in front and at the rear as shown for instance in Fig. 3. This has the important effect that in addition to the deflection due to the alternation of the wires $a^1$, $a^2$, the streams of air issuing from the interstices or passages between these wires encounter the solid obstruction opposed by the joints $b$ of the next band, and a further dispersal of the stream, accompanied by highly effective purification, is thus effected.

The combination of the transverse rods $b$ with the close coils of wire thereon is also of importance in other respects. Where liquid is used to assist in retaining dust, it is of importance in assisting the distribution of the liquid over the surface of the filter, and in retaining the same a suitable length of time in operation, whether there is a continual supply or trickle of such liquid, or whether the liquid is supplied at intervals. Where liquid is to be absorbed from a moist stream of air or gas, the said arrangement is of importance in preventing the liquid from being carried through the filter, and it facilitates the conduction of the deposit or sludge from the filter. Each of the joints forms as it were a tube, having lateral openings or crevices, with a rod $b$ fitting loosely therein. The bands are thus able to retain a comparatively considerable quantity of liquid for some length of time, especially, for example, in cases where oil is used, so that the oil only becomes slowly absorbed by the dust retained, and the filter remains for a comparatively lengthy period coated or charged with a viscous substance, some of which drops off in the form of conglomerate, the remainder being removed at intervals by washing.

It is also possible, for example with an arrangement such as shown in Fig. 3, to combine bands of coarse and fine texture in the same filter or filter element, and to use wet bands in conjunction with dry bands. Thus, for example, a coarse dry band may be used for retaining fibres and minute fragments or particles of textile materials, while a wet band or bands is or are used in conjunction therewith to retain coarse and fine dust.

In regard to details of construction, shape and arrangement, many variations can be made. The filter may, for example consist of endless bands arranged to rotate, and there may be an arrangement for automatically cleaning it, continuously or at intervals, by means of brushes or by washing.

Fig. 3 shows a typical construction with a rectangular frame, say 1.5 meters high and 0.5 meters wide, adapted to form part of a composite filter such as shown in Fig. 4. With the approximate dimensions stated the bands are convenient to manipulate, when cleaning them and placing them in position. Instead of being straight, the bands may be arranged zig-zag fashion or otherwise bent, so that in a very simple manner the effective surface is doubled or even tripled in a small space.

Fig. 5 shows a modification in which the filter bands are wound upon a hollow reel or drum $d$, from which they can easily be removed when required. The drum may be horizontal instead of vertical. The thickness of the filter can easily be changed by adding or removing layers.

Fig. 6 shows a very simple arrangement for automatically cleaning the filter. The filter in this case consists of a plurality of layers united and disposed obliquely in an air or gas channel B. In this channel tappers $e$ are suspended, normally resting against the filter surface but adapted to be set in vibration by the air or gas current, so that in swinging to and fro they will intermittently tap the filter, and thus cause the conglomerate of dust to drop down, for example into a well C provided for that purpose. The kind and configuration of the tappers or knockers is immaterial for the purposes of my invention, the tappers being shown, as an instance, in Figure 6 of the drawing as consisting of a substantially triangular plate mounted on a stem which is swingingly secured to the end of a rope or the like, suspended from the wall B; however, any other kind of tappers may be used in connection with my invention.

Fig. 7 shows a filter composed of a plurality of endless bands of different lengths suspended upon a continuously or intermittently rotating spindle $f$ in a flue or channel B, so that they hang like a curtain in this channel. With this arrangement the air, laden with dust, has to traverse each band twice, that is to say in front of the spindle, and behind it, so that with a small number of bands a dense and very effective filter can be obtained. As stated, the bands are preferably of different lengths, and they hang into a tank D, in which by reason of their different lengths, they are spaced apart, to facilitate the removal of the conglomerate of dust and the like in and on them. This cleansing operation can be effected in various ways, for example by a roller brush $g$, or by means of liquid.

It will be seen that the filter has a number of very important advantages. In addition to those already enumerated, the device has the advantage of being simple, and therefore cheap to manufacture, and of being easily adaptable to the particular requirements of any given purpose or place.

I wish it to be understood that I do not desire to be limited to the exact details of construction shown and described, for obvious modifications will occur to persons skilled in the art.

I claim:

1. In a gas and air filter a plurality of superimposed layers of transversely interlinked, substantially parallel helical members with the interlinked joints in staggered relation in the different layers, and supporting means for said layers.

2. In a gas and air filter a plurality of superimposed layers of transversely interlinked parallel flattened helical members with the interlinked joints in staggered relation in the different layers, and means for collectively supporting and securing said layers.

3. In a gas or air filter a plurality of superimposed layers of transversely interlinked substantially axially parallel flattened helical members with the interlinked joints in staggered relation in the different layers, and means for stretchedly and collectively supporting said layers.

4. In a gas and air filter, extending and supporting means, a plurality of superimposed layers of transversely interlinked, substantially parallel helical members of different individual length of said members in the different layers, and secured to said extending and supporting means.

5. In a gas and air filter, an extending and supporting member, and a plurality of axially extended, substantially flattened spiral springs with interlinking alternately arranged windings, secured to said member.

6. In a gas and air filter, a gas and air conduit, a plurality of axially extended, substantially flattened spiral springs with alternatingly interlinked windings, and means securing said spiral springs in cooperative relation with said conduit.

7. In a gas and air filter, a gas and air conduit, a plurality of superimposed layers of substantially flattened spiral springs having transversely alternatingly interlinked windings, and means securing said layers of spiral springs in cooperative relation with said conduit.

8. In a gas and air filter, a gas and air conduit, a plurality of superimposed layers of transversely interlinked, substantially parallel helical members with the interlinked joints in staggered relation in the different layers, and means for supporting said layers in operative relation with said conduit.

9. A filter for air and gases, comprising supporting means, a plurality of wire spirals on said supporting means and substantially parallelly arranged, and straight retaining wires interlinked with the adjacent spirals.

10. A filter for air and gases, comprising supporting and securing means, a plurality of layers of wire spirals on said supporting and retaining means, and substantially parallelly arranged, and substantially straight wires connecting the adjacent wire spirals of each layer.

In testimony whereof I affix my signature.

HERMANN KLUG.